US006264894B1

(12) United States Patent
Bertling

(10) Patent No.: US 6,264,894 B1
(45) Date of Patent: Jul. 24, 2001

(54) SAFETY DEVICE FOR PIPETTING AIDS

(76) Inventor: Wolf Bertling, Meisenweg 22, 91056 Erlangen (DE)

( * ) Notice: Subject to any disclaimer, the term of this patent is extended or adjusted under 35 U.S.C. 154(b) by 0 days.

(21) Appl. No.: 09/202,315

(22) PCT Filed: Jun. 12, 1997

(86) PCT No.: PCT/DE97/01183

§ 371 Date: Jan. 25, 1999

§ 102(e) Date: Jan. 25, 1999

(87) PCT Pub. No.: WO97/47389

PCT Pub. Date: Dec. 18, 1997

(30) Foreign Application Priority Data

Jun. 13, 1996 (DE) .............................................. 196 23 538

(51) Int. Cl.[7] ................................ B01L 3/02; G01N 1/14

(52) U.S. Cl. ............................ 422/100; 422/99; 422/104; 436/180; 73/864.14

(58) Field of Search ..................................... 422/100, 104, 422/99; 436/180; 73/864.03, 864.11, 864.14

(56) References Cited

U.S. PATENT DOCUMENTS 989,503 * 4/1911 Hilderbrand .
2,516,965 * 8/1950 Dresser ................................ 248/121
2,540,360 * 2/1951 Ulvild ................................ 73/425.6
2,724,275 * 11/1955 Persson et al. ..................... 73/425.6
2,728,232 * 12/1955 Bremmer ............................ 73/425.6
3,893,813 * 7/1975 Johnson ................................ 23/292
4,114,659 * 9/1978 Goldberg et al. ...................... 141/26
5,510,083 * 4/1996 Sack et al. ........................... 422/100
5,985,219 * 11/1999 Lind .................................... 422/104

FOREIGN PATENT DOCUMENTS 381 891 11/1964 (CH) .
950 035 10/1956 (DE) .
92 05 961 7/1992 (DE) .

* cited by examiner

*Primary Examiner*—Jill Warden
*Assistant Examiner*—Kathryn Bex
(74) *Attorney, Agent, or Firm*—Pearne & Gordon LLP

(57) ABSTRACT

The invention relates to a device for holding a pipette in a pipetting aid, permitting gastight insertion of the pipette into the pipetting aid without contact pressure having to be exerted by the person handling it, spreader elements (2) being cast in a soft rubber or plastic aperture bead of the pipetting aid, and it being possible for the spreader elements (2) to have their positions relative to each other changed by tensioning elements (3) in such a way that the aperture bead can be widened for the insertion of the pipette.

11 Claims, 2 Drawing Sheets

SAFETY DEVICE FOR PIPETTING AIDS

Figure 1:
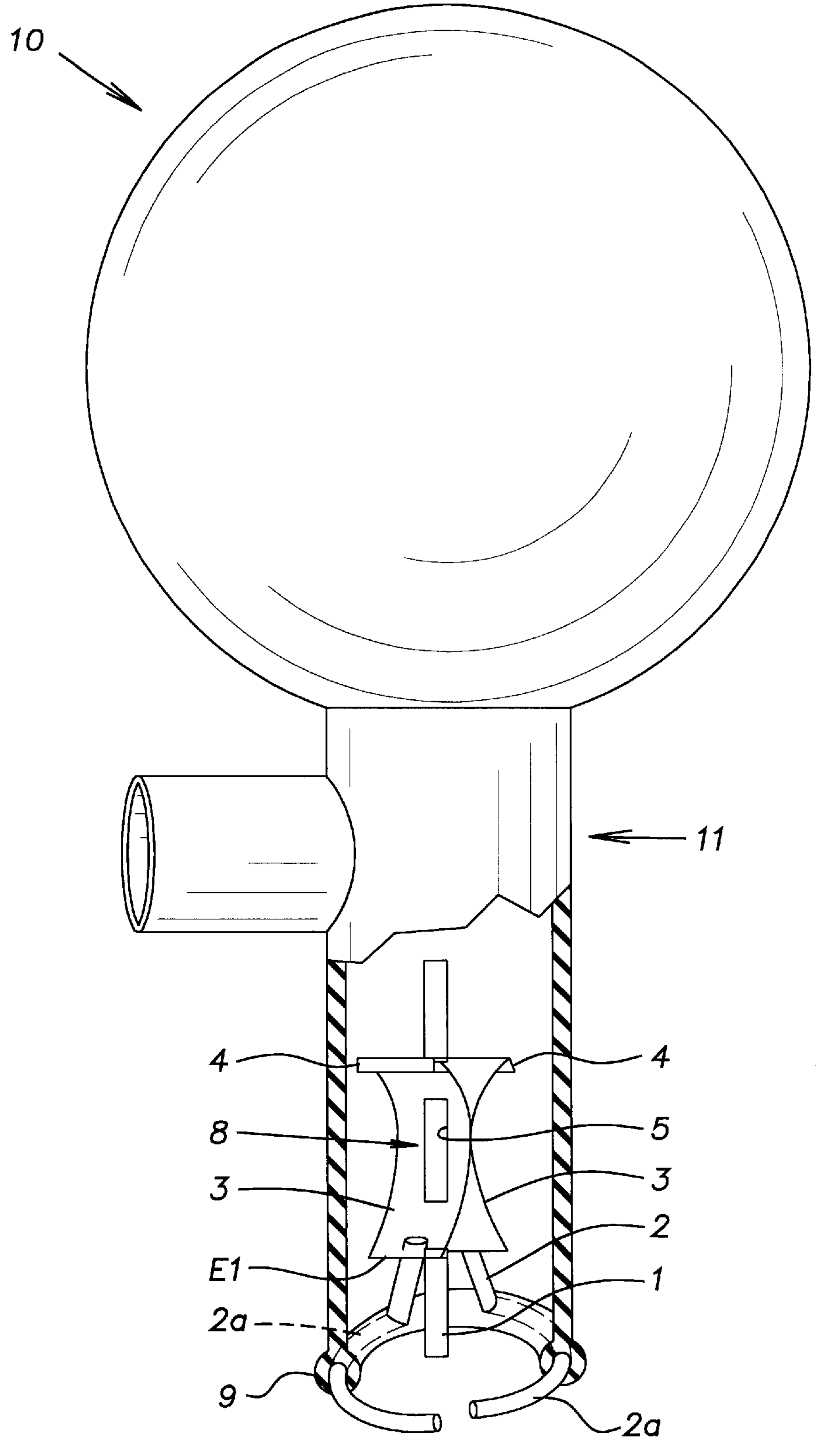

The invention relates to a device for holding a pipette in a pipetting aid, permitting gastight insertion of the pipette into the pipetting aid without contact pressure having to be exerted by the person handling it.

Pipetting aids which are known in the prior art have an essentially soft plastic or rubber attachment part suitable for holding pipettes. The end part of conventional pipettes which is intended for insertion into the pipetting aid usually has an external diameter of about 7 mm and can generally be inserted 1 to 2 cm into the attachment part or the neck of the pipetting aid. To make insertion easier, the attachment part of the pipetting aid is given a conical shape in the area of its aperture. By pressing the end part of the pipettes against the conical aperture, the end part is pushed into the attachment part of the pipetting aid. In doing so, the soft plastic or rubber closes tightly round the end part of the pipette.

In the case of Peläus balls and similar pipetting aids, the attachment part is not shaped conically. Here, an outer rubber bead is provided which has a slightly smaller internal diameter than the external diameter of the end part of the pipette. In order to introduce the end part of the pipette into the attachment part, a pressure or contact pressure has to be overcome here to ensure the necessary gastight insertion of the end part of the pipette into the pipetting aid. When inserting the pipette into the pipetting aid with pressure, it often happens that the pipettes break, particularly those made of glass. In some circumstances this can lead to serious injuries to the person handling the pipette.

The object of the present invention is to remedy the disadvantages of the prior art. In particular, the aim is to make available a device for holding a pipette in a pipetting aid, with which device the risk of injury when inserting the pipette into the pipetting aid is reduced.

This object is achieved by the features of Claim 1. Expedient embodiments of the invention are evident from the features of claims 2 to 12.

According to the invention, a device for holding a pipette in a pipetting aid is provided, permitting gastight insertion of the pipette into the pipetting aid without contact pressure having to be exerted by the person handling it, spreader elements being cast in a soft rubber or plastic aperture bead of the pipetting aid, and it being possible for the spreader elements to have their positions relative to each other changed by means of tensioning elements in such a way that the aperture bead can be widened for the insertion of the pipette. The proposed device allows the operator to insert the end part of the pipette into the attachment part of the pipetting aid without exerting any appreciable contact pressure. In this way, breakage, especially of pipettes made of glass, is avoided during insertion. The risk of injury is reduced.

Figure 2:
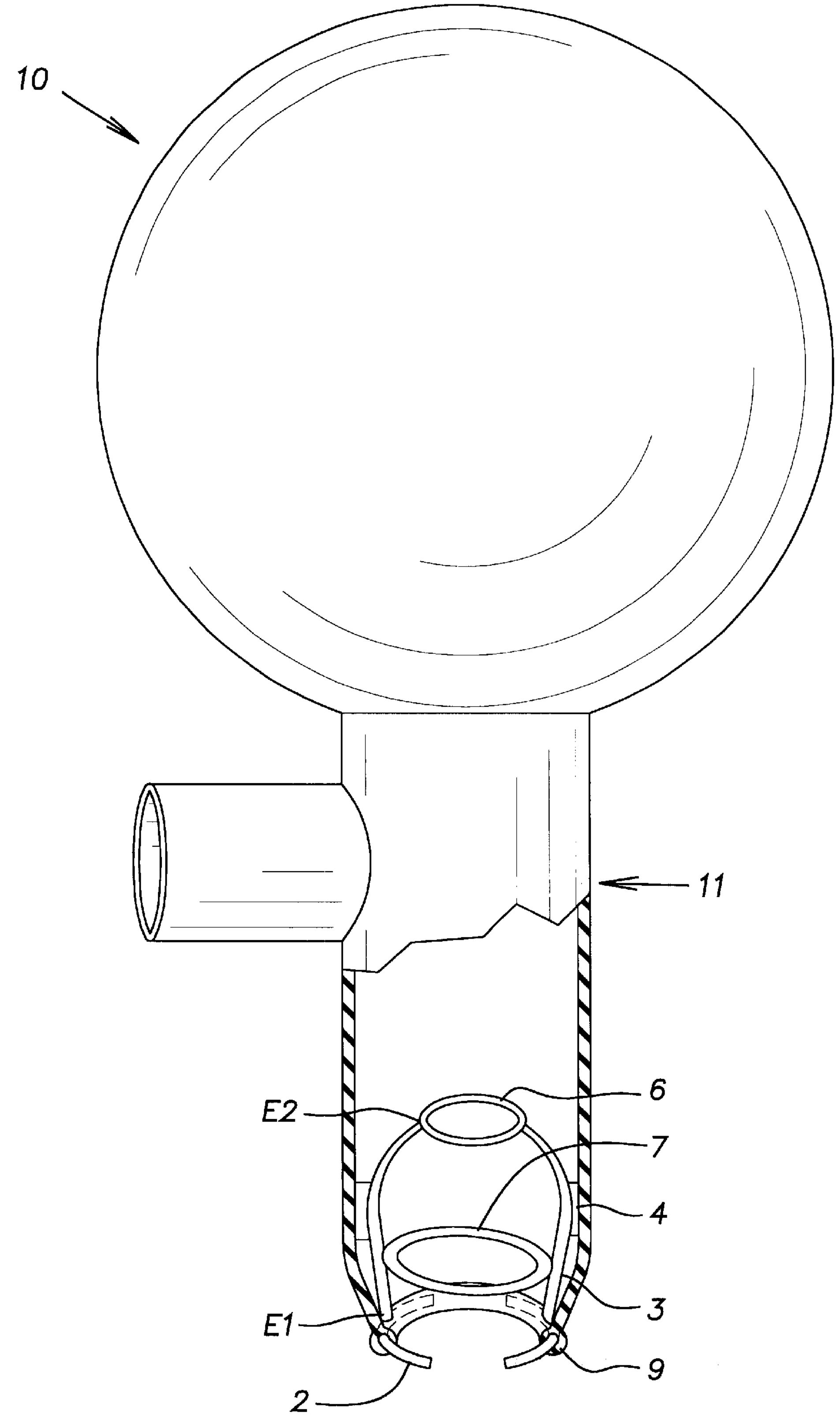

Illustrative embodiments of the invention are explained in greater detail below with reference to the drawing, in which:

FIG. 1 shows a perspective representation of a first illustrative embodiment of the device, and FIG. 2 shows a perspective representation of a second illustrative embodiment of the device.

A first illustrative embodiment of the device is shown in perspective representation in FIG. 1. The device is usually disposed in the neck 11 of a pipetting aid 10. The device consists of two spreader elements 2 which are each connected at their first end E1 to tensioning elements 3 which are designed in the form of a curved strip. The spreader elements 2 each have a semicircle-shaped section **2*a*. The section 2*a* is cast in the aperture bead 9 of the pipetting aid 10. The tensioning elements 3 each have a slit-shaped recess 5. They are arranged in such a way that they bear against each other with their external diameter. In this way the recesses 5 form a passage for a pressure equalization aperture 8, such as a hollow connection 1. The tensioning elements 3 also have thickened parts 4** serving as pressure points. In the illustrative embodiment shown here, the tensioning elements are designed as tensioning springs, which are made of spring steel.

FIG. 2 shows, in perspective representation, a further illustrative embodiment of the device. The spreader elements 2 are each connected to the first end E1 of a tensioning element 3. The two ends E2 of the two tensioning elements are connected to a rigid ring 6 which is cast in the neck 11 of the pipetting aid 10. The spreader elements 2 have thickened parts 4 on their outsides and these thickened parts 4 serve as pressure points for pressing the spreader elements together. A further rigid ring 7 is situated between the spreader elements 2 and a plane formed by the thickened parts 4, which ring 7 is likewise cast in the neck of the pipetting aid. The further ring 7 can be connected to the tensioning elements 3. The tensioning elements 3 are here made of a spring or tensioning wire.

The device functions as follows:

When pressure is exerted on the thickened parts 4, the spreader elements 2 are moved apart by the tensnioning elements 3. This causes a radial widening of the aperture bead 9 of the pipetting aid 10. Because of this widening, it is no longer necessary to exert pressure on the pipette in order to insert the end part of said pipette into the pipetting aid. In this way, breakage, in particular of glass pipettes, is avoided during insertion.

List of Reference Labels

1 Hollow connection
2 Spreader element
**2*a*** Semicircle-shaped section
3 Tensioning spring
4 Thickened part
5 Recess
6 Rigid ring
7 Further rigid ring
E1 First end of the tensioning springs
E2 Second end of the tensioning springs

What is claimed is:

1. Pipetting aid with a device for holding a pipette, permitting gastight insertion of the pipette into the pipetting aid without requiring contact pressure to be exerted by the person handling the pipette, said device comprising spreader elements, said spreader elements being disposed within an aperture bead of the pipetting aid, the aperture bead being made of flexible rubber or plastic, and tensioning elements for changing the position of the spreader elements so that the aperture bead is widened for the insertion of the pipette.

2. Pipetting aid according to claim 1, wherein two spreader elements are provided.

3. Pipetting aid according to claim 2, wherein the spreader elements have an essentially semicircle-shaped section.

4. Pipetting aid according to claim 1, wherein each of the spreader elements is connected in each case to a first end of the tensioning element.

5. Pipetting aid according to claim 1, wherein the tensioning elements are made of a spring steel.

6. Pipetting aid according to claim 1, wherein the tensioning elements are designed in the form of a curved strip and are arranged so that they bear against one another with their external radius.

7. Pipetting aid according to claim 6, wherein the tensioning elements have a recess.

8. Pipetting aid according to claim 7, wherein a pressure equalization aperture is provided for pressure equalization between a cavity behind the aperture bead and the pipetting aid.

9. Pipetting aid according to claim 8, wherein the pressure equalization aperture is a hollow connection engaging the recesses.

10. Pipetting aid according to claim 8, wherein the spreader elements are in each case connected at their second end to a rigid ring, said ring being disposed in a neck of the pipetting aid.

11. Pipetting aid according to claim 10, wherein a further rigid ring is disposed in the neck of the pipetting aid.

* * * * *